(12) United States Patent
Hart et al.

(10) Patent No.: US 10,990,834 B2
(45) Date of Patent: Apr. 27, 2021

(54) METHOD AND APPARATUS FOR OBJECT DETECTION IN CAMERA BLIND ZONES

(71) Applicant: GM GLOBAL TECHNOLOGY OPERATIONS LLC, Detroit, MI (US)

(72) Inventors: Nathaniel W. Hart, Beverly Hills, MI (US); Robert D. Sims, III, Milford, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 61 days.

(21) Appl. No.: 16/218,550

(22) Filed: Dec. 13, 2018

(65) Prior Publication Data

US 2020/0193178 A1 Jun. 18, 2020

(51) Int. Cl.
| | | |
|---|---|---|
| *G06K 9/00* | (2006.01) | |
| *B60W 30/09* | (2012.01) | |
| *G06T 5/00* | (2006.01) | |
| *G06T 5/50* | (2006.01) | |
| *B60Q 1/02* | (2006.01) | |
| *B60Q 1/00* | (2006.01) | |

(52) U.S. Cl.
CPC ....... *G06K 9/00805* (2013.01); *B60Q 1/0023* (2013.01); *B60Q 1/02* (2013.01); *B60W 30/09* (2013.01); *G06T 5/002* (2013.01); *G06T 5/50* (2013.01)

(58) Field of Classification Search
CPC ....... G06K 9/00805; G06T 5/50; G06T 5/002; B60Q 1/0023; B60Q 1/02; B60W 30/09
See application file for complete search history.

(56) References Cited

U.S. PATENT DOCUMENTS

| | | | |
|---|---|---|---|
| 10,549,678 B1* | 2/2020 | Schueler | B60Q 1/0023 |
| 2011/0025849 A1 | 2/2011 | Buchberger et al. | |
| 2014/0043483 A1* | 2/2014 | Schuder | H04N 7/18 348/148 |
| 2014/0125813 A1* | 5/2014 | Holz | G06K 9/38 348/169 |
| 2015/0063647 A1* | 3/2015 | Ryu | G06T 7/215 382/104 |
| 2015/0066310 A1* | 3/2015 | Kim | G05D 3/10 701/49 |
| 2018/0299900 A1* | 10/2018 | Bae | G06K 9/6215 |
| 2019/0339706 A1* | 11/2019 | Batur | G06T 7/20 |

FOREIGN PATENT DOCUMENTS

| | | |
|---|---|---|
| CN | 103568935 A | 2/2014 |
| CN | 104424477 A | 3/2015 |

* cited by examiner

*Primary Examiner* — Marcus Hammonds
(74) *Attorney, Agent, or Firm* — Lorenz & Kopf, LLP

(57) ABSTRACT

The present application generally relates to a method and apparatus for object detection in a location obscured from a camera field of view in a motor vehicle. In particular, the system is operative to illuminate a FOV from a low angle using a light source, capture an image of the FOV from a high angle and to detect a shadow within the image indicative of an object being illuminated by the light source.

20 Claims, 5 Drawing Sheets

METHOD AND APPARATUS FOR OBJECT DETECTION IN CAMERA BLIND ZONES

BACKGROUND

The present disclosure relates generally to cameras, and more particularly, includes cameras used on vehicles. More specifically, aspects of the present disclosure relate to systems, methods and devices for overcoming camera blind zones by utilizing a light emitting diode (LED) to project light from the vehicle and illuminate objects within a camera blind zone and detecting the resultant shadows within the camera field of view (FOV).

As autonomous vehicle, or automated driving assist features on vehicles, become more ubiquitous, detecting objects around a vehicle will become increasingly necessary to ensure proper control and handling of the vehicle. Digital cameras employed by vehicular systems receive light through a lens and may convert the incoming light rays to an electronic signal for display, evaluation or storage of the images defined by the light rays. As these cameras are more increasingly flush mounted with the vehicle body surface or located behind vehicle glass, the FOV of these cameras may become obstructed by other parts of the vehicle. Increasing the number of cameras and corresponding processing circuitry may be prohibitively expensive to overcome this issue.

For example, cameras for autonomous vehicle or automated driving assist systems ideally are mounted at a high point on the vehicle, such as behind the rear view mirror to enable a better view of the area surrounding the vehicle. However, these high points on the vehicle tend to result in obstructed views of the road surface immediately surrounding the vehicle It would be desirable to overcome these problems in order to reduce camera blind zones for a vehicular camera.

The above information disclosed in this background section is only for enhancement of understanding of the background of the invention and therefore it may contain information that does not form the prior art that is already known in this country to a person of ordinary skill in the art.

SUMMARY

Disclosed herein are object detection methods and systems and related control logic for provisioning vehicle sensing and control systems, methods for making and methods for operating such systems, and motor vehicles equipped with onboard sensor and control systems. By way of example, and not limitation, there is presented various embodiments of a camera system, LED light projection system, and image processing systems are disclosed herein.

In accordance with an aspect of the present invention, method comprising illuminating a field of view using a first light source, capturing an image of the field of view, detecting a shadow within the image, determining the presence of an object in response to the shadow, generating a control signal in response to the presence of the object, and controlling a vehicle in response to the control signal.

In accordance with another aspect of the present invention an apparatus comprising a light source for illuminating a field of view, a camera for capturing an image of the field of view, a processor for detecting a shadow within the image, for determining the presence of an object in response to the shadow and for generating a control signal in response to the presence of the object, and a vehicle controller for controlling a vehicle in response to the control signal.

In accordance with another aspect of the present invention an apparatus for determining the presence of an object within a field of view comprising an LED array for illuminating the field of view at a first time using a first LED and illuminating the field of view at a second time using a second LED, a camera for capturing a first image at the first time and a second image at the second time, a processor for comparing the first image and the second image to determine the presence of an object in response to the first image and the second image and to generate a control signal in response to the determination of the presence of the object, and a vehicle controller for controlling the vehicle in response to the control signal.

The above advantage and other advantages and features of the present disclosure will be apparent from the following detailed description of the preferred embodiments when taken in connection with the accompanying drawings.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
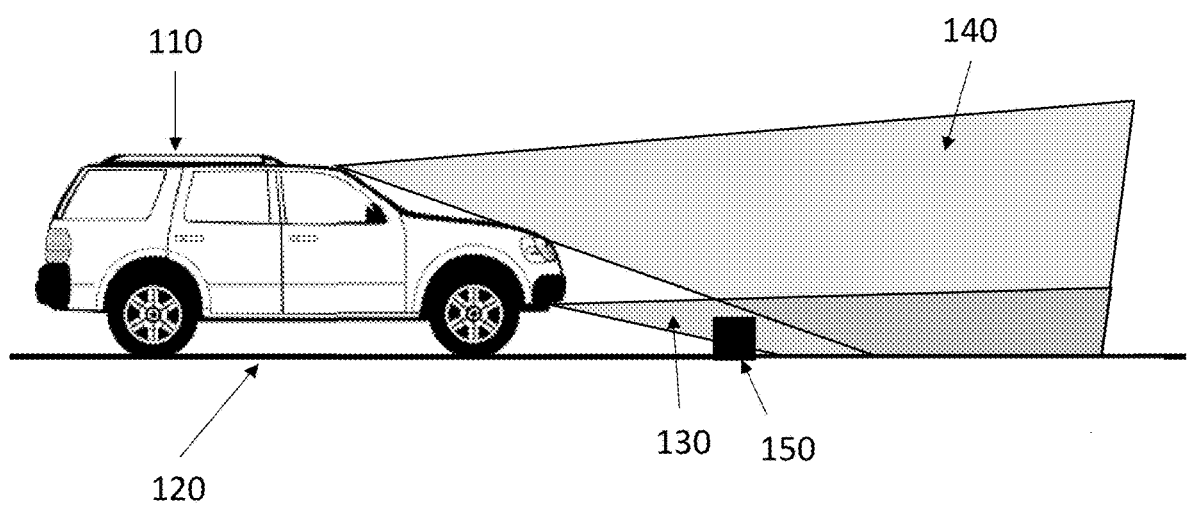
FIG. 1 illustrates an exemplary application of the method and apparatus for object detection in camera blind zones in a motor vehicle according to an embodiment of the present disclosure.

FIG. 1 schematically illustrates an exemplary application of the method and apparatus for object detection in camera blind zones in a motor vehicle 100 according to the present disclosure. In this exemplary embodiment, a vehicle 110 is traveling along a road surface 120. A camera is being used to capture images within a camera FOV 140. As can be see, the FOV 140 of the camera is partially obstructed by the leading edge of the hood of the vehicle 110. An object 150 is shown in the forward path of the vehicle 110 but outside of the FOV 140 of the camera.

The exemplary vehicle is further equipped with a LED projection system according to the presently disclosed system and method. A vehicle controller is operative to illuminate one or more LEDs mounted at a lower location on the front of the vehicle. In this example, one or more LEDs are mounted to the bumper valence panel of the vehicle. The LEDs are activated thereby illuminating the area in front of the vehicle. In this illustrative embodiment, the object 150 is illuminated and a shadow is cast by the object 130 into the FOV 140 of the camera. This process may be repeated with additional LEDs such that unique shadows are case within the FOV 140 in response to each LED being activated. The image processing circuitry within the vehicle 110 is operative to then detect the shadow within the image, and subsequently infer the presence of the object 150. A vehicle controller may then be operative to avoid the object or initiate a warning to a vehicle operator.

Figure 2:
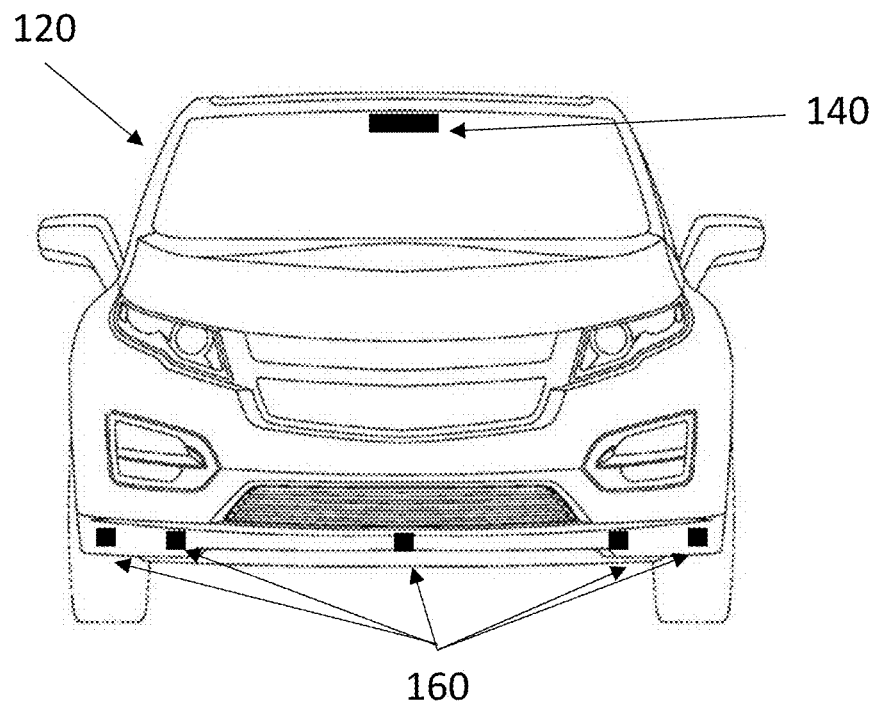
FIG. 2 an exemplary installation of the system for object detection in camera blind zones in a motor vehicle according to an embodiment of the present disclosure.

Turning now to FIG. 2, an exemplary installation of the system for object detection in camera blind zones in a motor vehicle 200 is shown. The exemplary installation is installed in the front side of a vehicle 120. A camera 140 is installed in a high location on the vehicle 140. In this exemplary embodiment, the camera 140 is installed behind, and at the upper edge of the windshield. The installation further has a plurality of LEDs 160 mounted near the road surface on the front bumper facia. Any number of LEDs can be used according to the currently disclosed system and method and is a matter of design choice.

Figure 3:
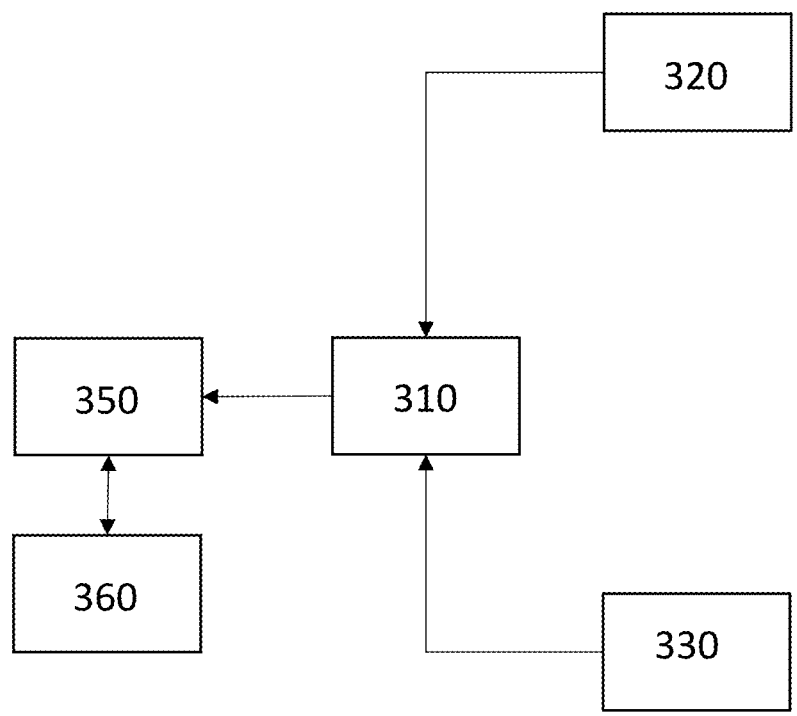
FIG. 3 shows a block diagram illustrating an exemplary system for object detection in camera blind zones in a motor vehicle of the present disclosure.

Turning now to FIG. 3, a block diagram illustrating an exemplary system for object detection in camera blind zones in a motor vehicle 300 is shown. The exemplary system comprises an image processor 310, a camera 320, an LED array 330, a vehicle processor 350, and a vehicle controller 360. In this exemplary embodiment, the system is a low cost system using LED array to detect objects at dripline of a vehicle front facia. The system is operative to detect near objects using a shadow when the object is in an area obscured from the camera 320. The camera 320 is operative to capture an image of a first FOV. In this exemplary embodiment, the FOV will be forward facing of the vehicle. The camera 320 is operative to capture the image, convert the image to a digital representation of the image and to couple this digital representation to the image processor 310. The camera 320 may include a high dynamic range sensor for detecting a greater range of luminance which may be advantageous in detecting shadows according to the presently disclosed methods and systems.

The LED array 330 may include a plurality of LEDs or a single LED to emit a visible or near visible light in the direction of the FOV. In this exemplary embodiment, the LED array 330 may be mounted lower than the camera 320, such that a shadow is created when an object obscured from the camera 320 is illuminated by the LED array 330. The LED array 330 may be operative to illuminate each LED sequentially such that a moving shadow is created when an object is illuminated. This moving shadow may be easier to detect by the image processor 310 when processing consecutive digital representations of captured images.

According to the exemplary embodiment, the image processor 310 is operative to receive the digital representation of an image captured by the camera 320 and to process this data. The image processor 320 may be operative to compare subsequent images to determine the appearance of a shadow or the like in response to at least one illuminated LED of the LED array 330. In response to the comparison, the image processor 320 may be operative to generate a control signal to indicate to the vehicle processor 350 the presence of a potential object within the direction of the FOV. The control signal may be indicative of the proximity of the object to the vehicle etc. The image processor may further be operative to process the digital representations of the image and to estimate locations of various objects within the FOV and to convey this information to the vehicle processor 350.

The vehicle processor 350 is operative to receive data from the image processor and to process a vehicle control algorithm in response to the data. The vehicle processor 350 is further operative to generate control signals for coupling to the vehicle controller 360. For example, the vehicle control algorithm may be an adaptive cruise algorithm wherein the vehicle processor 350 is operative to generate a control signals in order to keep the vehicle within a lane during highway driving and to avoid proximate objects during the operation. The control signals are coupled to the vehicle controller 360 for controlling the steering, braking, acceleration and the like in response to the control signals generated by the vehicle processor 350.

The exemplary system is operative to detect shadows within camera 320 FOV of objects in camera 320 blind zones from near objects using invisible Near Infrared LED array to project light from the vehicle. The LEDs within the array may be pulsed and synchronized with every other camera frame to remove strong ambient noise. The LEDs may be pulsed sequentially and synchronized with the camera to remove strong ambient noise. Optionally, the pulses may be temporally or spatially encoded for ambient light rejection. The system may be operative to triangulate object location based on shadow pattern and return intensity strength. The shadows may alternatively detected with a single wide FOV detector instead of camera.

Figure 4:
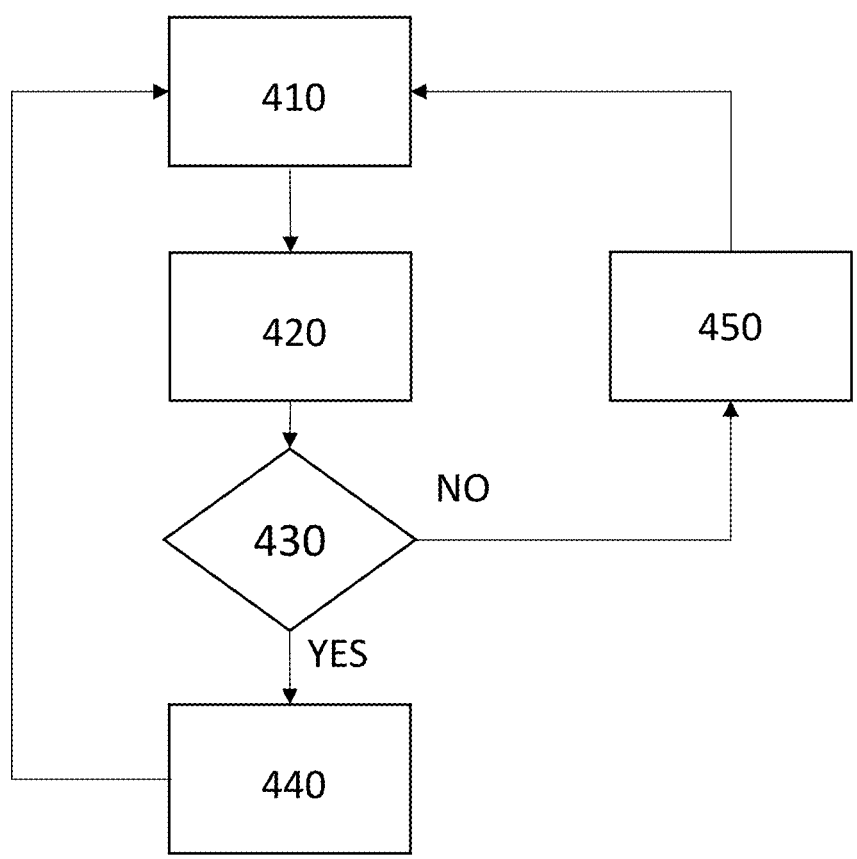
FIG. 4 shows a flowchart illustrating an exemplary method for object detection in camera blind zones according to an embodiment of the present disclosure.

Turning now to FIG. 4, a flow chart illustrating an exemplary method 400 for object detection in camera blind zones in a motor vehicle motor vehicle is shown. The exemplary method 300 is first operative to illuminate the FOV 410 from a low position on the vehicle using the LED array or other illuminating device. The camera is then used to monitor the illumination of the FOV using temporal and/or spatial operation 420. In temporal operation, the camera may be synchronized with LED illumination to remove strong ambient noise. In spatial operation, a single LED is illuminated at a time at the object location may be triangulated in response to return intensity strength. The method is then operative to determine if a shadow is detected 430. If a shadow is detected, an object is assumed to be present 440 and a control signal is generated indicative of the object and to return to illuminating the FOV 410. If no shadow is detected, 450, the method is operative to return to illuminating the FOV 410.

Figure 5:
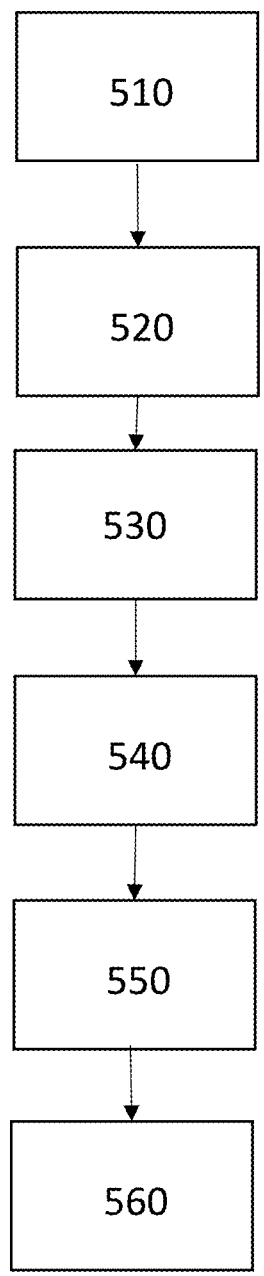
FIG. 5 shows a flow chart illustrating an exemplary method for object detection in camera blind zones in a motor vehicle motor vehicle during low contrast conditions according to an exemplary embodiment of the present disclosure.

Turning now to FIG. 5, a flow chart illustrating an exemplary method 400 for object detection in camera blind zones in a motor vehicle during low contrast conditions is shown. The low contrast conditions may result in a low contrast shadow due to strong ambient lighting conditions such as bright sunlight or incoming headlights. The exemplary method 500 is first operative to synchronize image capture by the camera with LED illumination 510. The method is then operative to capture a first image with an LED illuminated 520. The method is next operative to capture a second image with the LED not illuminated 530. The first image is then subtracted from the second image to generate a noise free shadow image 540. The object is then detected in response to the noise free shadow image and fused with the conventional image 550. This image is then processed by the image processor or coupled to the vehicle processor for use in a vehicle control algorithm 560.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or combination in with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method comprising:
   illuminating, by a light source mounted to a bumper valance of a vehicle, a field of view using a first light source;
   capturing, by a detector mounted at an upper edge of a vehicle windshield located above the bumper valance, an image of the field of view;
   detecting by a processor, a shadow within the image;
   determining by the processor, the presence of an object in response to the shadow wherein the object is obscured in the image;
   generating by the processor, a control signal in response to the presence of the object; and
   controlling by a vehicle controller, the vehicle in response to the control signal.

2. The method of claim 1 wherein a vehicle steering system is controlled in response to the control signal.

3. The method of claim 1 wherein the detector is located at a higher location on the vehicle than the light source.

4. The method of claim 1 wherein the field of view is illuminated by a light emitting diode.

5. The method of claim 1 wherein the field of view is illuminated by a plurality of light emitting diodes.

6. The method of claim 1 wherein the image includes a first image taken at a first time and a second image taken at a second time and the shadow is detected in response to a comparison of the first image and the second image.

7. The method of claim 1 wherein a warning is generated in response to the determination of the presence of the object.

8. The method of claim 1 wherein the shadow of the object extends into an unobscured portion of the image when the object is illuminated by the light source.

9. An apparatus comprising:
   a light source mounted to a bumper valance of a motor vehicle for illuminating a field of view;
   a detector mounted at an upper edge of a vehicle windshield located above the bumper valance, for capturing an image of the field of view;
   a processor for detecting a shadow within the image, for determining the presence of an object in response to the shadow and for generating a control signal in response to the presence of the object wherein the object is obscured in the image; and
   a vehicle controller for controlling a vehicle in response to the control signal.

10. The apparatus of claim 9 wherein the vehicle controller is operative to control a vehicle steering system in response to the control signal.

11. The apparatus of claim 9 wherein the detector is located at a higher location on the vehicle than the light source.

12. The apparatus of claim 9 wherein the light source is a light emitting diode.

13. The apparatus of claim 9 wherein the light source is a plurality of light emitting diodes.

14. The apparatus of claim 9 wherein the image includes a first image taken at a first time and a second image taken at a second time and the shadow is detected in response to a comparison of the first image and the second image.

15. The apparatus of claim 9 wherein the processor is further operative to generate a warning in response to the determination of the presence of the object.

16. The apparatus of claim 9 wherein the detector is a camera.

17. An apparatus for determining the presence of an object within a field of view comprising:
   an LED array mounted to a bumper valance of a motor vehicle for illuminating the field of view at a first time using a first LED and illuminating the field of view at a second time using a second LED;
   a camera mounted at an upper edge of a vehicle windshield located above the bumper valance, for capturing a first image at the first time and a second image at the second time;
   a processor for comparing the first image and the second image to determine the presence of an object in response to the first image and the second image and to generate a control signal in response to the determination of the presence of the object wherein the object is obscured in the first image and the second image; and
   a vehicle controller for controlling the vehicle in response to the control signal.

18. The apparatus of claim 17 wherein the processor is operative to determine the presence of a first shadow within the first image and a second shadow within the second image and wherein the presence of the object is determined in response to the first shadow and the second shadow.

19. The apparatus of claim 17 wherein the apparatus is part of an assisted driving system.

20. The apparatus of claim 17 wherein the vehicle controller is operative to control the steering system of a vehicle in response to the control system.

* * * * *